Patented Sept. 15, 1925.

1,554,032

UNITED STATES PATENT OFFICE.

EBENEZER EMMET REID, OF BALTIMORE, MARYLAND, ASSIGNOR TO E. I. DU PONT DE NEMOURS & COMPANY, OF WILMINGTON, DELAWARE, A CORPORATION OF DELAWARE.

BUTYL ESTERS OF PHTHALIC ACID.

No Drawing.   Application filed December 3, 1920.   Serial No. 428,018.

*To all whom it may concern:*

Be it known that I, EBENEZER EMMET REID, a citizen of the United States, and a resident of Baltimore, State of Maryland, have invented a certain new and useful Butyl Esters of Phthalic Acid, of which the following is a specification.

The present invention relates to butyl esters of phthalic acid, and comprises a new class of esters whose molecules have the following general graphical formula:

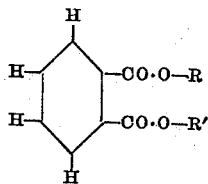

where R represents the radical $C_4H_9-$, and particularly the normal butyl radical, and R' represents a hydrogen, alkyl, or aryl radical.

The new esters, and especially the simple alkyl butyl phthalates, are in general colorless and nearly odorless liquids of low volatility, and form excellent solvents for terpenes, esters, aldehydes, etc., such as are used in perfumery.

Although my invention includes the neutral phthalic esters of the various isomeric butyl alcohols such as isobutyl alcohol, I consider the normal-primary butyl phthalates, whose molecules have the atomic grouping

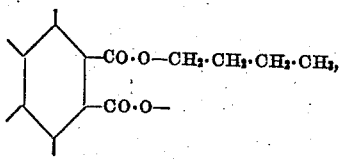

and particularly di-n-butyl phthalate, as most suitable for use as fixatives in perfume compositions.

Various processes may be followed in preparing the new esters, the following examples being merely illustrative:—

*Dibutyl phthalate.*

I. *From phthalic anhydride.*—Three parts by weight of phthalic anhydride are added to 3½ parts of normal butyl alcohol (B. P. 115–117° C.) and the mixture heated to 117° C. for eight hours. This completes the first reaction with the formation of mono-butyl phthalate which remains dissolved in the excess alcohol. Three per cent by weight of dry hydrogen chloride is dissolved in the mixture, which is again heated to 117° for eight hours. The second reaction is accompanied by the separation of a layer of water. This layer is separated and the heating continued for an additional eight hours. The resulting liquid product is first washed with water to remove the hydrochloric acid; then with sodium carbonate to remove the monobutyl phthalate and any free phthalic acid; and finally with water several times until neutral. The di-butyl phthalate is purified from alcohol and dried by passing a current of air through the liquid heated to 160° C. The product is a liquid, odorless, slightly yellow in color and may be obtained water white by distilling under diminished pressure. The yield is 83.6% of the theoretical. Boiling point under 29 mm. pressure is 210° C.

II. *From phthalic acid.*—The use of phthalic acid requires a catalyst for both stages of the reaction. One part by weight of phthalic acid is mixed with 2.5 parts of normal butyl alcohol (B. P. 115–117° C.). Three per cent by weight of dry hydrogen chloride is dissolved in the mixture, which is heated to 117° for twenty-four hours. The water which forms as a lower layer is drawn off from time to time and more hydrogen chloride added toward the latter part of the heating. The product is washed and purified in the same manner as described above. The yield from phthalic acid is 79.2% of the theoretical.

Di-n-butyl phthalate has the following physical constants:—

Sp. gr. $\frac{21.3°}{4°}$ 1.0501.

Refractive index at 20° 1.4911.
Boiling point at 20 mm. 206° C.
Boiling point at 760 mm. 340° C.—With decomposition.

*Mono-(normal) butyl phthalate.*

III. Mono-butyl phthalate is obtained as a by-product from either of the above methods and is recovered by acidifying the sodium carbonate wash waters. This can be utilized in the preparation of di-butyl phthalate or for the purpose of making mixed esters. It is a white crystalline solid melting at 73–74° C., soluble in all the usual organic solvents and in alkali. Recrystallized from acetone or alcohol it is obtained in large rhombic plates.

For the production of mixed phthalic esters containing one butyl group, I preferably prepare the monobutyl phthalate or other monoalkyl phthalate by heating phthalic anhydride with an equivalent amount of the alcohol; the acid ester is then converted into the neutral mixed ester by introducing an aryl radical (such as phenyl or tolyl) or an alkyl radical different from the first. The second radical may be introduced in several ways of which the following are typical:—

(a) The mono ester may be added to an equivalent amount of the alcohol with which it is to interact and a catalyst may be added such as hydrogen chloride or sulphuric acid. On gentle heating esterification will take place and the product will be largely the desired mixed ester but ester transposition will take place and more or less of the possible simple phthalates will be formed, e. g., if monobutyl phthalate be heated with one molecule of ethyl alcohol and hydrogen chloride, the product will consist largely of ethyl-butyl phthalate but will contain some dibutyl phthalate and some diethyl phthalate.

(b) In case the alcohol to be used to introduce the second radical is high boiling it is sometimes possible to dispense with the catalyst by using a higher temperature and displacing the water formed by heating the mixture in a vacuum or passing a current of dry hydrogen through it during the heating. The temperature will have to be rather high, 150° to 200°. If the alcohol distills out with the water, more can be added. This method has the same disadvantage as the above, that is more or less of the two simple diphthalates are apt to be formed.

(c) The sodium salt of monobutyl, or other mono-alkyl phthalate, may be heated with an alkyl halide, e. g., sodium monobutyl phthalate with ethyl bromide. It is obvious that the order of introducing the alkyl groups may be reversed. A large variety of mixed esters may be prepared in this way, but deserving special notice is the use of benzyl chloride or bromide and their substitution products for carrying out this reaction, since these halides react particularly easily with such salts. The reaction may be carried out in alcohol, a mixture of alcohol and water, or even in water alone, and in some cases it may be practicable to dispense with a solvent entirely.

IV. *Ethyl butyl phthalate.*—Ethyl alcohol and phthalic anhydride in equal molecular proportions are heated together on a water-bath until all of the anhydride is dissolved. The monoethyl phthalate formed is dissolved in dilute sodium hydroxide to form the sodium salt, and to this solution an equivalent quantity of normal butyl bromide is added and the mixture refluxed for twenty hours. A little ethyl alcohol may be added to increase the solubility of butyl bromide in the solution, thereby increasing the rate of reaction. At the end of the heating the lower layer containing the ethyl butyl phthalate is separated, washed with a solution of sodium carbonate to remove phthalic acid, then with water until neutral, and finally heated on a steam-bath to free it from butyl bromide, alcohol and water. The resulting product is a light yellow, odorless liquid insoluble in water, which is further purified and obtained as a colorless liquid by distilling under diminished pressure. The yield is only fair.

The physical constants of ethyl (normal) butyl phthalate are:

Sp. gr. $\frac{21.3°}{4°}$ 1.0793.

Refractive index at 20° 1.4950.
Boiling point at 20 mm. 183° C.
Boiling point at 760 mm. 327–330° C.—With decomposition.

V. *Butyl benzyl phthalate.*—222 grams of normal butyl acid phthalate are dissolved in a liter of ethyl alcohol, and the solution is poured into 500 cc. of ethyl alcohol in which 23 grams of sodium have been dissolved. 126 grams of benzyl chloride are then added and the resulting mixture is boiled for about 70 minutes, by which time the reaction will be nearly complete. By adding water, a heavy oil composed mainly of butyl benzyl phthalate may be caused to separate.

VI. 222 grams of normal butyl acid phthalate and 40 grams of sodium hydroxide are dissolved in 5 liters of water, and the resulting solution of sodium butyl phthalate is boiled with 126 grams of benzyl chloride under reflux until the esterification is practically complete.

The butyl benzyl phthalate produced in the manner above described is a heavy oil having an extremely low volatility.

The other esters of monobutyl phthalate, as for example the methyl, propyl, or amyl butyl phthalates, may be obtained by a process closely similar to that described under Example IV or by processes similar to those of Examples V and VI.

I claim:

1. As a new composition of matter, an ester of phthalic acid whose molecular structure is expressed by the following general formula:

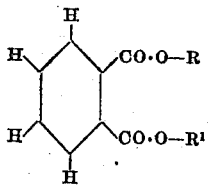

where $R^1$ stands for a hydrocarbon radical, and R represents a normal-butyl alcohol radical having the empirical formula $C_4H_9—$.

2. An ester of the type defined in claim 1 in which $R^1$ represents an alkyl radical.

3. A composition of matter comprising an ester of phthalic acid whose molecules contain the following atomic grouping:

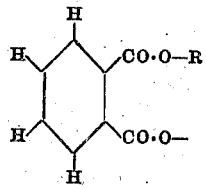

where R represents the radical of a normal primary butyl alcohol.

4. An ester of the type defined in claim 1 in which R represents the following normal-primary-butyl radical: $CH_3.CH_2.CH_2.-CH_2—$.

5. Dibutyl ortho-phthalate.

6. Di-normal-butyl ortho-phthalate.

7. Di-normal-primary butyl ortho-phthalate having a specific gravity (21.3°/4°) of 1.0501, a refractive index at 20° C. of 1.4911, and a boiling point of 206° C. under an absolute pressure of 20 mm. of mercury.

8. A composition of matter comprising di-normal-primary-butyl ortho-phthalate.

In testimony whereof I affix my signature.

EBENEZER EMMET REID.